Jan. 22, 1946.  L. H. MORIN  2,393,551
DUAL SLIDER UNIT
Filed April 16, 1943  3 Sheets-Sheet 1

INVENTOR
Louis H. Morin
BY
ATTORNEYS

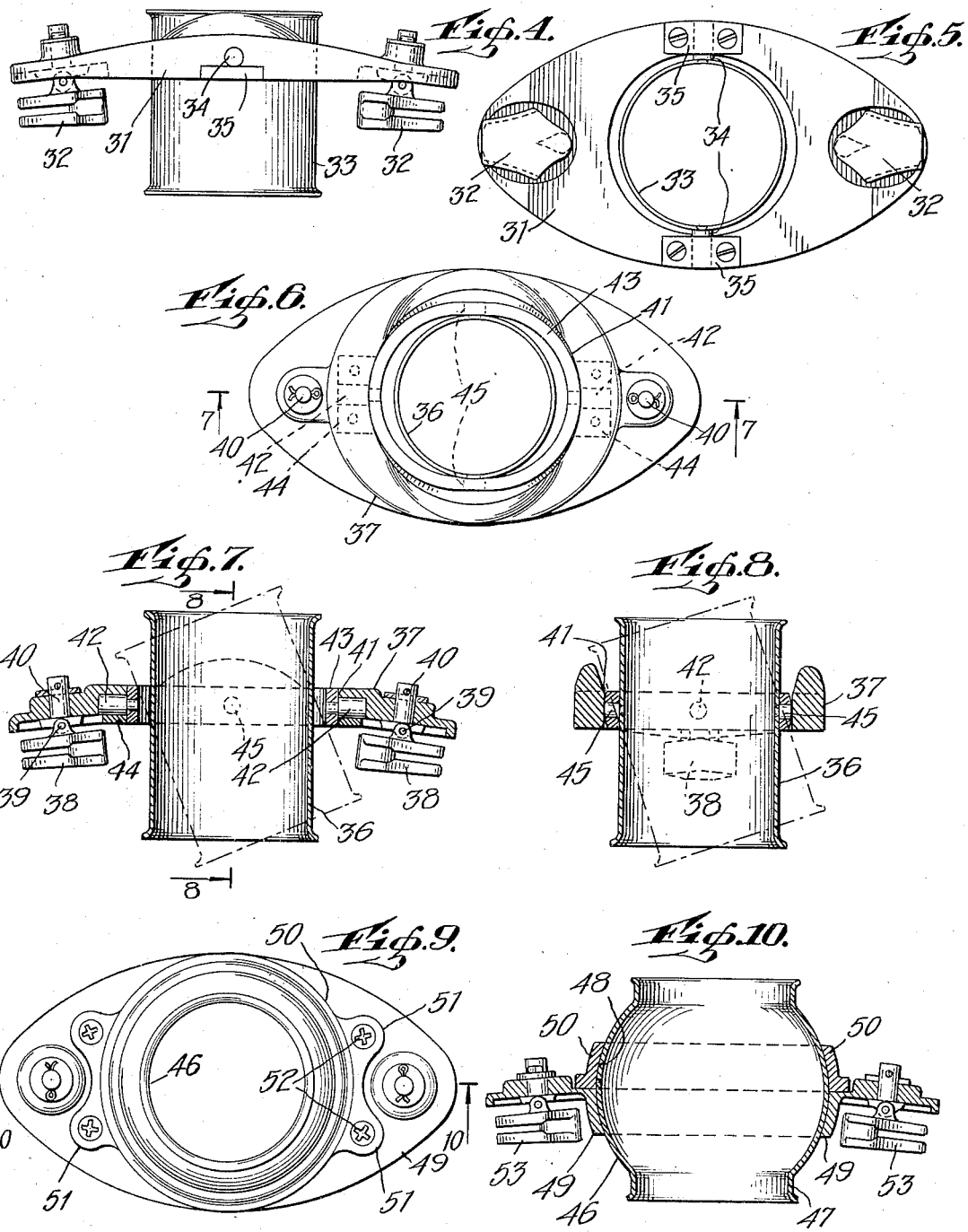

Jan. 22, 1946.  L. H. MORIN  2,393,551
DUAL SLIDER UNIT
Filed April 16, 1943   3 Sheets-Sheet 3

INVENTOR
Louis H. Morin
BY
Gifford Scull Burgess
ATTORNEYS

Patented Jan. 22, 1946

2,393,551

UNITED STATES PATENT OFFICE 2,393,551

DUAL SLIDER UNIT

Louis H. Morin, Bronx, N. Y., assignor of one-half to Davis Marinsky, Bronx, N. Y.

Application April 16, 1943, Serial No. 483,227

12 Claims. (Cl. 24—205)

This invention relates to slider units adaptable for use on separable fastener stringers employing what is known as double action scoops. More particularly, the invention relates to units of this kind employing apertured or ring like bodies having sliders at opposite end portions thereof for coupling the fastener stringers beyond the limits of said ends of the body while maintaining the stringers spread beyond the limits of the opening therein. Further in providing within said ring like bodies tubular guides having pivotal or more or less universal mountings within the body in supporting and guiding a member passed through said ring like body. Still further, the invention relates to ring like or hollow bodies having anti-frictional means for supporting and guiding said bodies at opposite sides thereof over tracks or runways, and further to hingedly coupling side portions of the body to form hingedly coupled parts thereof.

The novel features of the invention will be best understood from the following description when taken together with the accompanying drawings, in which certain embodiments of the invention are disclosed, and in which the separate parts are designated by suitable reference characters in each of the views; and in which:

Fig. 4 is a view similar to Fig. 2, showing a modification.

Fig. 5 is a bottom plan view of the structure as seen in Fig. 4.

Fig. 6 is a top plan view of another form of slider unit which I employ.

Fig. 7 is a section on the line 7—7 of Fig. 6.

Fig. 8 is a section on the line 8—8 of Fig. 7.

Fig. 9 is a view similar to Fig. 6, showing another adaptation of the invention.

Fig. 10 is a section on the line 10—10 of Fig. 9.

The slider units forming the basis of this application are substantially of the general type and kind disclosed in my prior applications 466,746 filed November 24, 1942, Patent No. 2,344,049, issued March 14, 1944, and 468,759 filed December 12, 1942. In other words, the slider units are adapted for mounting on stringers having double action scoops to move along the stringers in maintaining an opening of given dimensions intermediate the dual sliders of the unit. One illustration or use of the invention is to provide a guide for the barrel of a gun in its movement through the slot or aperture in the turret of an airplane, tank or similar apparatus, keeping the slot or opening closed at both sides of the gun barrel.

The present invention deals still more particularly with a swiveled or universally mounted guide within the slider unit for guiding and supporting the gun barrel or other member, and to provide swinging or universal movement of the barrel or member within the frame or body structure of the slider unit. Further, the invention deals with the provision of anti-friction guides for the unit over tracks or runways to provide freer movement of the slider unit longitudinally of the slot or opening controlled by the stringers opened and closed by said unit. Still further my invention deals with a slider unit body composed of separate parts having a hinged mounting on the shafts or stubs, forming supports for said rollers or other anti-frictional devices.

Figure 1:
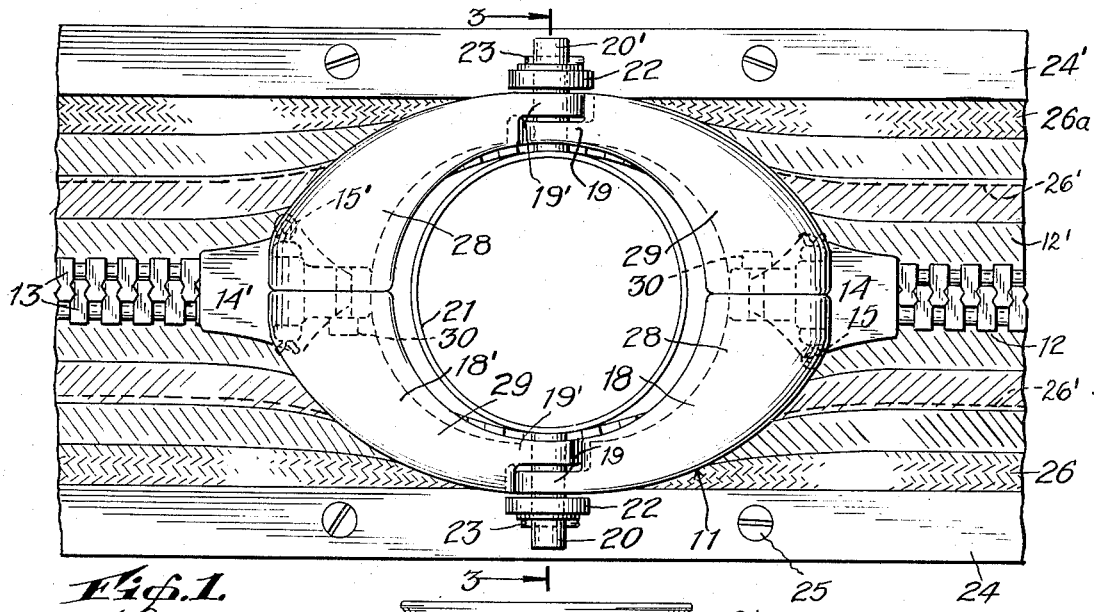
Fig. 1 is a plan view of a part of a turret opening, showing one of my improved fasteners controlling said opening with a slider unit thereon.
Figure 2:
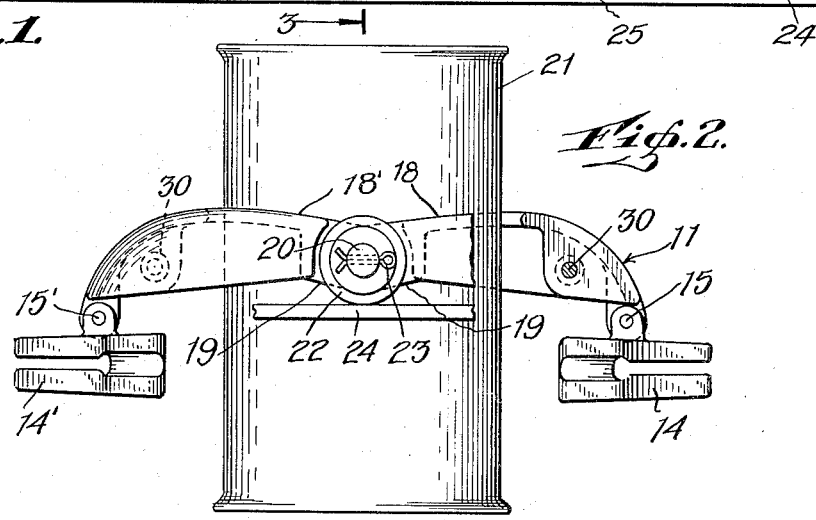
Fig. 2 is a side view of the unit shown in Fig. 1 detached, and illustrates one of the guide rails.
Figure 3:
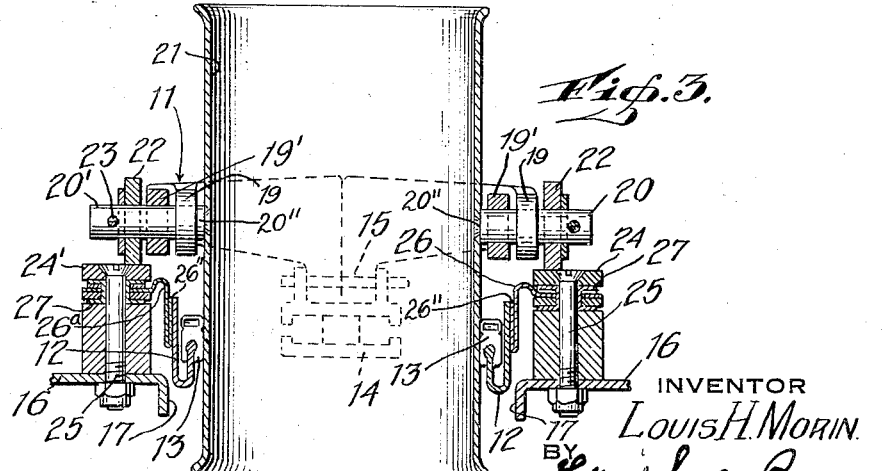
Fig. 3 is a section on the line 3—3 of Fig. 1.

Considering the structure shown in Figs. 1 to 3 inclusive, 11 represents a slider unit movable along two stringers 12, 12', having interengaging double action links or scoops 13 adapted to be coupled beyond the limits of the body 11 by more or less conventional sliders 14, 14', having a pivoted or other mounting, as at 15, 15', so that the sliders may be free to swing in compensating for curvatures in the wall structure 16 of a turret or other supporting part, which is shown in section, in Fig. 3 of the drawings. The stringers 12, 12', control an elongated slot or opening 17, formed in the turret wall structure 16.

The body 11 is composed of two similar side portions 18, 18', having overlapping apertured lugs 19, 19', at the ends thereof to receive stub shafts or pins 20, 20', which form hinged pins or pintles providing relative swinging movement of the parts 18, 18', to further compensate for irregular or sharp curvatures in the turret wall structure. Riveted to the inner ends of the pins 20, 20', as shown at 20'' is an elongated tube 21, and the pins 20, 20', form a swivel mounting of this tube in the body 11 so that the tube is free to swing on the pivots 20, 20', within said body, thus providing independent movement of a gun barrel into different angular positions while maintaining a more or less definite line of travel through the slot or opening 17.

The ends of the pins 20, 20', project beyond the outer lugs 19, and mounted thereon are anti-friction rollers 22 retained against displacement by cotter pins 23. These rollers are mounted to move over tracks or supporting strips 24, 24', secured to outer surfaces of the turret body 16 along opposite sides of the opening 17, as indicated by the screws 25. These screws also securely retain the supporting strips 26, 26a, of the stringers in connection with the turret, as will clearly be seen upon a consideration of Fig. 3 of the drawings. The strips 26 have eyelets or the like 27 therein, through which the screws 25 pass, and the tapes of the stringers 12, 12', are stitched, 26', and cemented, 26'', to the supporting strips 26, 26a.

It will also appear from a consideration of Fig. 3 of the drawings that the stringers, including the strips 26, 26a, fold at the pivoted or hinged sides of the body 11, and are guided and spaced by the tube 21.

In the construction shown, the two similar halves 18, 18', of the body 11 are each formed of two parts 28 and 29, bolted or otherwise secured together as indicated at 30. The purpose of this is solely for simplifying the formation of the castings.

Figs. 4 and 5 of the drawings show a slight modification of the construction shown in Figs. 1 to 3, which disposes with the pivoted separate parts 18, 18', and also the use of the guide rollers 22. In this construction a one-piece body 31 is employed, to the contracted ends of which are swivel mounted sliders 32. With this construction the tubular guide or supporting body 33 has its pivot or swivel pins 34 retained against displacement from the body 31 by detachable plates 35. This type of slider unit is intended for uses where the unit is traveling along more or less straight paths or over supports having slight curvatures.

In Figs. 6, 7 and 8 is shown another adaptation of the invention which differs primarily from the structure shown in Figs. 4 and 5, in providing what might be termed a more or less universal mounting of a central tubular body 36, or in providing what is commonly referred to as a binnacle mounting.

In this construction 37 represents the slider body having at the ends sliders 38 pivoted as at 39 to swivel pins 40, thus providing a more or less universal mounting of the sliders in the ends of the body 37. Supported in the aperture 41 of the body 37 on pivot pins 42 is a ring like liner 43, the pins 42 being held in place by retaining plates 44. The pivot mounting at 42 provides swinging movement of the ring 43 in one direction, that is to say, transverse to the travel of the body 37. Pivotally supported to the ring 43 at right angles to the pins 42, as at 45, is the center tube or guide 36.

It will thus be seen from a consideration of Figs. 7 and 8 of the drawings that this tube or guide 36 is capable of the dual swinging motions within the body 37, providing what might be termed a true universal movement along the barrel of a gun to swing laterally as well as to tilt longitudinally of the slot or aperture in the turret.

In Figs. 9 and 10 of the drawings is shown a still further adaptation of the invention wherein a bulged or partially cylindrical body 46 is formed centrally of a tubular guide member 47 to form a ball like seating in a correspondingly formed socket 48, provided between separable parts 49 and 50 of a slider body unit. The part 50 being in the form of a retaining ring facilitating attachment and detachment of the member 47. The ring 50 has projecting apertured ears 51, facilitating attachment to the primary part 49 by screws or other devices 52, note Fig. 9. With this construction the sliders 53 have the same mounting in connection with the ends of the body part 49, as shown in Fig. 7.

Figure 11:
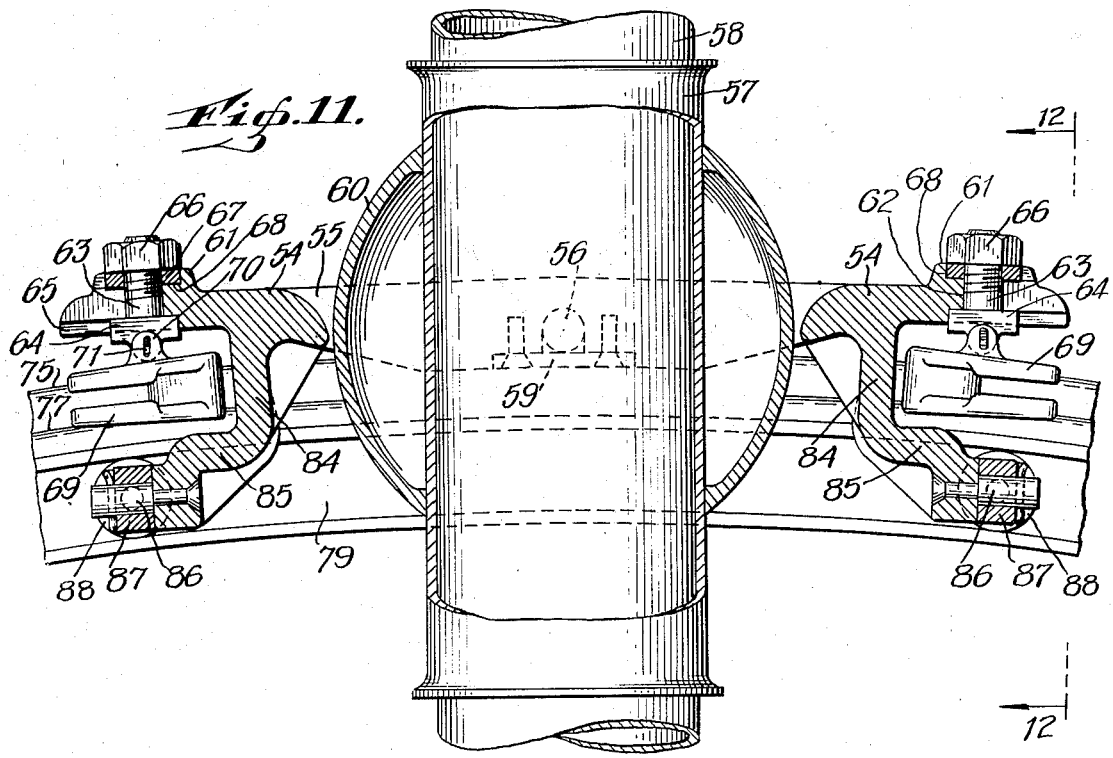
Fig. 11 is an enlarged view similar to Fig. 7, showing another adaptation of the invention.
Figure 12:
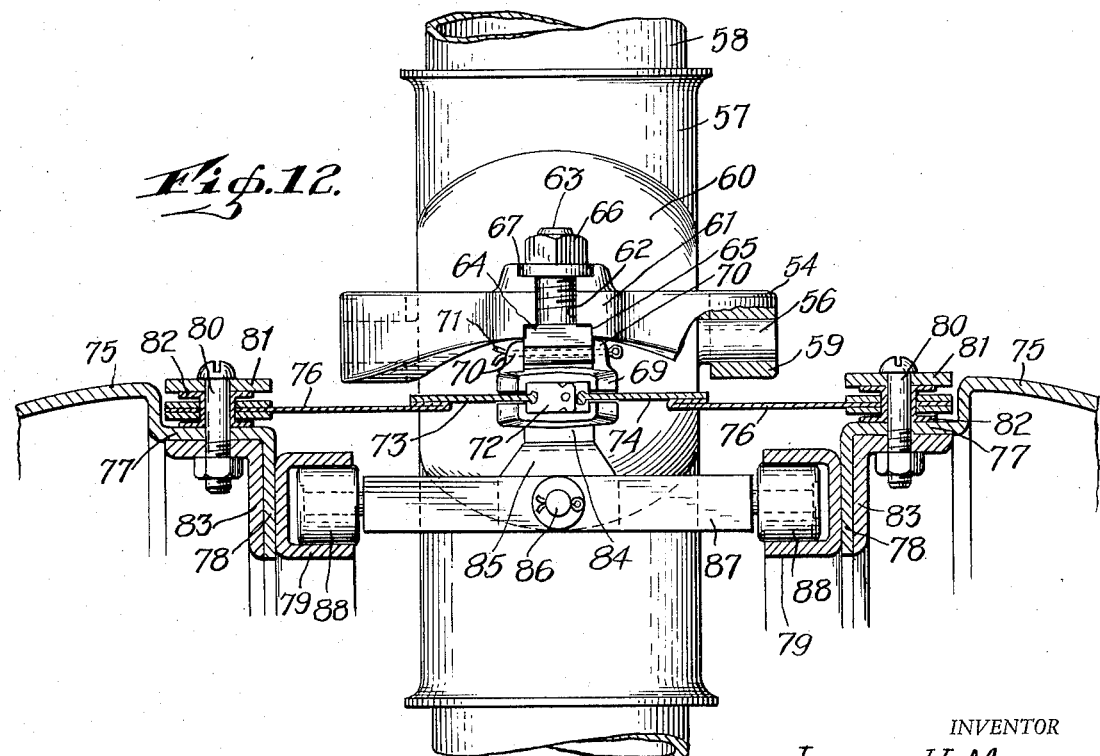
Fig. 12 is a sectional view substantially on the line 12—12 of Fig. 11, and including the fastener stringers.

In Figs. 11 and 12 of the drawings is shown a further adaptation of the invention incorporating the slider body generally of the structure shown in Fig. 4, modified to the extent to include bracket portions for pivotally supporting shafts adjacent the slider elements, the shafts carrying at their ends rollers which operate in guide channels, in supporting and guiding the slider unit in connection with the turret body in such manner as to take both inward and outward thrust to which the stringers may be subjected in movement of the gun barrel through the pivoted guide, as the barrel is moved longitudinally of the slot controlled by the stringers. In this construction the barrel guide is also moved to the extent of incorporating domed portions on opposite sides of the barrel guiding sleeve to combine to some degree the straight tube structures, as in Figs. 1 to 3, with the barrel structure as in Figs. 9 and 10.

In Figs. 11 and 12, the slider unit is generally indicated by the reference 54. As above stated the body 54 is generally of the contour of the body shown in Fig. 4, except that the elliptical opening 55 is extended to form a greater ellipse, and pivoted in opposed narrow walls of this elliptical body on pivots 56 is a tube 57, forming a guide for a gun barrel partially shown at 58. The pivots 56 are held in place by retaining plates 59, as with the structure shown in Figs. 4 and 5. The tube 57 includes at opposite side portions thereof outwardly bulged or domed portions 60, which merge with the side walls of the tube 57 but which extend to substantially fill the greater elliptical contour of the opening 55.

The end portions 61 of the body 54 are contracted, and provided with elongated slots 62 which open outwardly through said ends to provide quick mounting of slider supporting studs 63 in said ends. The studs 63 have heads 64 which operate in channels 65. The nuts 66 of the studs retain key washers 67 in countersunk recesses 68, which retain the studs against displacement from the ends 61.

Slider elements 69 are provided with raised ears 70 through which the studs 63 are passed, cotter or similar pivot pins 71 for pivoting the slider elements to said studs.

The slider elements 69 are of more or less conventional construction, and serve to couple and uncouple the links or scoops 72 of stringers 73, 74, note Fig. 12, the tapes of the stringers being attached to the frame-work 75 of the turret through supplemental tapes 76.

Opposed side walls of the slot or opening in the turret 75 have inwardly extending flange portions fashioned to form countersunk stringer supporting shafts 77, terminating in inwardly directed flanges 78 in connection with which are supported guide rails 79 of channel cross sectional form. The strips 76 are secured to the shelves 77 by bolts 80, which first pass through facing strips 81, then through eyelets on reinforced edges of the tapes 76, as indicated at 82, through the shelves 77 and then through reinforcing angle irons 83 which also serve to reinforce the flange portion 78.

At the end portion 61 of the body 54 and inwardly of the slider 69 are downwardly extending brackets 84 having offset end portions 85 arranged beneath the slider 69, as clearly indicated in Fig. 11 of the drawings. Mounted in the end portions 85 are pivot pins 86 which pass through central portions of transverse shafts or guide rods 87. The terminal ends of the shafts 87 include freely rotatable antifriction rollers 88 supported and mounted in any desired manner which operate freely in the channels of the guide rails 79.

The pivotal mounting of the guide shafts or rods 87 will provide for the transverse swinging movement of the barrel within the limits provided for such movement of the barrel within the body 54, whereas the pivot of the tube 57 will compensate for different angular positions that the barrel may assume with respect to the slot of the turret as the barrel moves longitudinally of the slot, and particularly where the barrel moves through a long slot, and when the contour of the turret wall is not on a radius common to the axis of swinging movement of said gun barrel. In this latter movement the barrel also slides through the sleeve or tube 57, and in these differential movements the guide shafts or rods 87 operate in the channel rails 79 to care for inward and outward thrust to which the unit 54 may be subjected, thus relieving stresses or strain upon the stringers 73, 74, and the mounting tape 76.

In all forms of construction disclosed, it will appear that in each instance the slider body includes a tubular guide and supporting member in the aperture of said body, which has a pivotal or swinging movement in at least one direction, and that the sliders at opposed ends of the body have in like manner a swinging movement in at least one direction. These various movements compensate for the travel of the unit through openings formed in wall structures of a turret or other support which may have varied contours or curvatures, and the purpose of these different swinging as well as more or less universal mountings is to facilitate not only the free and easy movement of the slider unit, but also of the gun barrel or other member operating within the unit, resulting in the quick and substantially frictionless response to quick adjustable movements of a gun barrel in combat.

Having fully described my invention, what I claim as new and desire to secure by Letters Patent is:

1. A slider unit for separable fastener stringers, said unit comprising a hollow body, sliders movably coupled with end portions of said body and means comprising a tubular member movable relative to said hollow body and adapted to maintain the stringers in spaced relation to each other within the limits of said body and adapted to maintain an opening shiftable along the stringers, and said member being swingable in said body in at least one direction.

2. A slider unit for separable fastener stringers, said unit comprising a hollow body, sliders movably coupled with end portions of said body and means comprising a tubular member movably supported within the hollow body maintaining the stringers in spaced relation to each other within the limits of said body and adapted to maintain an opening shiftable along the stringers, and said member having pivot pins in opposed walls thereof supported in adjacent walls of said body in pivotally mounting the member in said body.

3. A slider unit for separable fastener stringers having links, said unit comprising a hollow body, sliders movably coupled with end portions of said body and adapted to engage the stringer links to maintain the links of opposed stringers coupled beyond the limits of said body in the movement of the body longitudinally of said stringers, tracks on the stringers at opposite sides of and in spaced relation to said links, and anti-frictional rollers on said body and engaging said tracks in supporting the body in the movement thereof longitudinally of the stringers.

4. A slider unit for separable fastener stringers having links, said unit comprising a hollow body, sliders movably coupled with end portions of said body and adapted to engage the stringer links to maintain the links of opposed stringers coupled beyond the limits of said body in the movement of the body longitudinally of said stringers, tracks on the stringers at opposite sides of and in spaced relation to said links, anti-frictional rollers on said body and engaging said tracks in supporting the body in the movement thereof longitudinally of the stringers, and a tubular member mounted in the opening of said hollow body and movably supported therein.

5. In a support having an elongated opening therein and separable fastener stringers having links for closing the opening in said support, the combination of a slider unit on the fastener movable longitudinally of the stringers in coupling and uncoupling the same, said unit defining a small opening shiftable along said support in the movement of the unit along said stringers, means at opposite sides of the stringers in spaced relation to the links thereof and on corresponding sides of the slider unit for supporting and guiding the slider unit in its movement relatively to said stringers, said last named means comprising anti-friction rollers on stub shafts of the slider unit, and said shafts forming hinge connections for separate parts of said unit.

6. A slider unit for stringers of separable fasteners, said unit comprising a hollow body, sliders on opposed ends of said body and maintaining the stringers closed beyond the limits of said body in the movement thereof longitudinally of the stringers, a ring pivotally supported in said body, and a tubular member pivotally mounted in said ring on pivots disposed at right angles to the pivots of the ring in said body, thereby forming a universal mounting of the tubular member in said body.

7. A slider unit for stringers of separable fasteners, said unit comprising a hollow body, sliders on opposed ends of said body and maintaining the stringers closed beyond the limits of said body in the movement thereof longitudinally of the stringers, a tubular member mounted for universal movement in the opening of said hollow body, and means detachable with respect to said body for coupling and uncoupling the tubular member therewith.

8. In a support having an elongated opening therein and a separable fastener for closing the opening in said support, the combination of a slider unit on the fastener movable longitudinally of the stringers thereof in coupling and uncoupling the same, said unit defining a small opening shiftable along the opening of said support in the movement of the unit along said stringers, means at opposite sides of the stringers in spaced relation to the links thereof and on corresponding sides of the slider unit for supporting and guiding the slider unit in its movement relatively to said stringers, said last named means comprising guide shafts supported at opposite ends of said slider unit, and means forming channels in which the ends of said shafts are free to operate.

9. A slider unit for separable fastener stringers, said unit comprising a hollow body, sliders movably coupled with end portions of said body, means comprising a tubular member movably supported within the hollow body maintaining the stringers in spaced relation to each other within the limits of said body and in maintaining an opening shiftable along the stringers, means extending longitudinally of the stringers forming a supporting guide for said body, and means at end portions of said body, in spaced relation to said sliders, engaging said last named means in supporting and guiding the body in its movement longitudinally of the stringers.

10. A slider unit for separable fastener stringers, said unit comprising a hollow body, sliders movably coupled with end portions of said body, means comprising a tubular member movably supported within the hollow body maintaining the stringers in spaced relation to each other within the limits of said body and in maintaining an opening shiftable along the stringers, a pair of spaced guide channels extending longitudinally of the stringers, means at end portions of said body engaging both of said channels for supporting and guiding the body in its movement longitudinally of the stringers, and means for movably supporting the last named means in connection with said body.

11. In slider units movable along stringers mounted in spaced supports, means on the supports and on end portions of said unit for supporting and guiding the unit in its movement along the stringers and in said supports, and said means comprising members pivotally coupled with the end portions of said unit.

12. In separable fasteners employing stringers, a slider unit movable along the stringers, said unit having contracted fork shaped slider supporting ends, studs keyed to said ends to prevent displacement from said unit ends, and sliders pivotally coupled with said studs.

LOUIS H. MORIN.